United States Patent
Peck

(10) Patent No.: US 7,825,336 B2
(45) Date of Patent: Nov. 2, 2010

(54) ELECTRICAL OUTLET BOX HAVING HIGH AND LOW VOLTAGE COMPARTMENTS

(75) Inventor: David M. Peck, Danbury, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 12/216,543

(22) Filed: Jul. 7, 2008

(65) Prior Publication Data

US 2010/0000756 A1    Jan. 7, 2010

(51) Int. Cl.
*H01H 9/02* (2006.01)

(52) U.S. Cl. .............................. 174/53; 174/50; 174/64; 174/58; 439/535; 248/906

(58) Field of Classification Search ................... 174/50, 174/58, 64, 53; 220/3.92, 3.94, 4.02; 439/535; 248/906

See application file for complete search history.

(56) References Cited

U.S. PATENT DOCUMENTS

| | | | | |
|---|---|---|---|---|
| 4,628,827 | A | * | 12/1986 | Litter .......................... 109/50 |
| 5,419,716 | A | | 5/1995 | Sciammarella et al. |
| 5,486,650 | A | * | 1/1996 | Yetter .......................... 174/53 |
| 5,594,207 | A | * | 1/1997 | Fabian et al. .................. 174/58 |
| 6,207,895 | B1 | * | 3/2001 | Engel .......................... 174/53 |
| 6,218,613 | B1 | * | 4/2001 | Justiniano et al. ............. 174/50 |
| 6,514,652 | B2 | * | 2/2003 | Cash, Jr. ..................... 439/106 |
| 6,573,446 | B1 | | 6/2003 | Umstead et al. |
| 6,653,561 | B2 | * | 11/2003 | Lalancette et al. ............ 174/50 |
| 6,669,041 | B2 | | 12/2003 | Almond |
| 6,835,890 | B2 | * | 12/2004 | Dinh et al. .................... 174/66 |
| 7,045,706 | B1 | | 5/2006 | Lincoln, III et al. |
| 7,290,674 | B1 | * | 11/2007 | Ledford ....................... 220/507 |
| 7,304,236 | B1 | | 12/2007 | Gretz et al. |
| 7,348,487 | B2 | | 3/2008 | Drane |
| 7,618,284 | B2 | | 11/2009 | Lamoureux et al. |
| 2007/0102181 | A1 | | 5/2007 | Rose |
| 2009/0014196 | A1 | | 1/2009 | Peck |

* cited by examiner

*Primary Examiner*—Dhiru R Patel
(74) *Attorney, Agent, or Firm*—Kevin M. Barner; Mark S. Bicks; Alfred N. Goodman

(57) ABSTRACT

An electrical device box which houses both high and low power devices, such as power and data receptacles, is disclosed. A detachable divider is inserted into the device box to separate the interior of the box into two separate chambers, one for housing the high power device and its corresponding wiring and a second chamber for housing the low power device ant its wiring. The divider is shaped such that one of the chambers has a greater volume than the other chamber and its orientation within the box can be reversed to selectively determine which of the two chambers has the greater volume. Additionally, the electrical box and divider are sizable to accommodate single-gang, double-gang, or larger, configurations.

17 Claims, 7 Drawing Sheets

ELECTRICAL OUTLET BOX HAVING HIGH AND LOW VOLTAGE COMPARTMENTS

FIELD OF THE INVENTION

This invention relates generally to an improved electrical outlet box for housing both high and low voltage devices. More particularly, the invention relates to an electrical outlet box having a movable offset divider that isolates a high voltage device housed within the box, such as an electrical power receptacle, from a low voltage device, such as a data receptacle, housed within the same box.

BACKGROUND OF THE INVENTION

Electrical outlet boxes that house power and/or data receptacles are well-known in the industry. Such boxes can stand alone or be recessed within any of a wall, the floor or the ceiling of a room. Many electrical boxes include a weatherproof cover or enclosure to prevent dust, water and other materials from entering the electrical receptacle. Additionally, some electrical boxes that house both high voltage receptacles, such as electrical power receptacles, and low power receptacles, such as telephone/data receptacles, have a divider between the high and low voltage devices to minimize potential interference between the corresponding wiring. An example of one known device of this type is disclosed in U.S. Pat. No. 6,218,613 to Justiniano et al. (the '613 Patent). The electrical box disclosed in the '613 Patent includes a "deflectable," i.e., flexible, isolation barrier installed into a standard double-gang device box to divide the available wiring space within the box into two separate compartments, one for communications conductors and the other for power conductors. The isolation barrier is either a stand alone structure that attaches to the inside surface of a wall plate or it is integral with a separate chamber inserted into the box. As the isolation barrier is inserted into the box, its free end contacts the rear wall of the box and flexes while remaining in contact with the rear wall of the box, thus permitting the barrier to be used in device boxes having different depths.

Another known electrical box in which the interior of the box is divided into separate high and low voltage compartments is disclosed in U.S. Pat. No. 7,038,132 to Lowe et al. (the '132 Patent). The '132 Patent discloses an outlet box that incorporates two separate boxes for accommodating both line and signal voltage wiring. A flush box, which substantially resembles a typical single-gang receptacle box, includes a flange cover that attaches the flush box to a recessed box. When the flush box and recessed box are connected together, a portion of the flush box resides within the recessed box and a second portion remains outside the recessed box. An L-shaped movable barrier separates the space within the recessed box into a line voltage chamber and a signal voltage chamber. The box disclosed in the '132 Patent is complicated to manufacture and occupies significantly more space than a single standard electrical box.

Various other electrical boxes are known in which the wiring for both line and signal voltage devices is terminated. These boxes typically include a planar divider that separates the interior of a single or double-gang electrical box into two chambers having the same volume. For example, FIGS. 5 and 6 illustrate an electrical wall box similar to the box disclosed in prior patent application Ser. No. 11/826,036, assigned to the same assignee as the present application, the entire contents of which are incorporated herein by reference for all that is taught. More particularly, in the wall box disclosed in that application, planar divider 550 divides box 500 into two chambers of equal volume. Further, divider 550 intersects knockout 525. That is, because the divider intersects the entire interior volume of the box, including the knockout 550 located in the back wall of the box, the entire area of the opening corresponding to knockout 525 is not available for wiring that enters either chamber.

In FIG. 6 it is shown that planar divider 550 slides between guides 650 and divides the interior volume of the box in the same plane, from the top of the box at 610 to the floor of the box 620. In accordance with the prior box shown in FIG. 6, flanges 627, 628 extend outward from the frame of the box and provide mounting holes 629 to which a receptacle 575 (FIG. 5) is attached.

It is often necessary, however, due to various code requirements or physical limitations of the site at which the box is to be installed, to provide an electrical box that separates the interior space into separate chambers having different specific volumes, for example, a larger volume for high voltage devices and a smaller volume for low-voltage devices. It is often also necessary that the box being separated into high and low voltage chambers be a single-gang electrical box. There exists, therefore, a need for an improved single-gang electrical outlet box that can accommodate both high and low voltage components, each having its own specific chamber having a different respective volume.

SUMMARY OF THE INVENTION

Illustrative, non-limiting embodiments of the present invention overcome the aforementioned and other disadvantages associated with related art electrical boxes. Also, the present invention is not required to overcome the disadvantages described above and an illustrative non-limiting embodiment of the present invention may not overcome any of the problems described above.

More particularly, to address the above-mentioned issues related to conventional methods and devices for providing line and signal voltage wiring and/or receptacles within a single electrical box, in accordance with one object of the present invention a single-gang electrical box is provided which includes a housing and a divider that separates the interior volume of the housing into two separate chambers. A first chamber provides an enclosed area with a given volume for terminating corresponding wiring to a high, or line, voltage receptacle device. A second chamber provides an enclosed area for terminating corresponding wiring to a low, or signal, voltage receptacle device.

A further object of the present invention is to provide an electrical box with a divider shaped to separate the interior of the box into two separate chambers having different volumes.

A still further object of the present invention is to provide an electrical box with a divider that separates the interior of the box into two different sized chambers where the divider can be rotated to selectively determine which of the two chambers has a larger volume.

A still further object of the present invention is to provide an electrical box with a divider that separates the interior of the box into two chambers where knockouts located in each of the ends as well as the bottom of the box housing each provide access to the interior of the housing when the divider is installed.

As used herein "substantially", "generally", and other words of degree, are used as a relative modifier intended to indicate permissible variation from the characteristic so modified. It is not intended to be limited to the absolute value or characteristic which it modifies but rather approaching or approximating such a physical or functional characteristic.

BRIEF DESCRIPTION OF THE DRAWINGS

The aspects of the present invention will become more readily apparent by describing in detail illustrative, non-limiting embodiments thereof with reference to the accompanying drawings, in which:

FIG. 1b is a close-up view of the flange 28 shown as part of the electrical outlet of FIG. 1a.

DETAILED DESCRIPTION OF ILLUSTRATIVE, NON-LIMITING EMBODIMENTS

Exemplary, non-limiting, embodiments of the present invention are discussed in detail below. While specific configurations and dimensions are discussed to provide a clear understanding of the invention, it should be understood that the disclosed dimensions and configurations are provided for illustration purposes only. A person skilled in the relevant art will recognize that other dimensions and configurations may be used without departing from the spirit and scope of the invention.

Figure 1A:
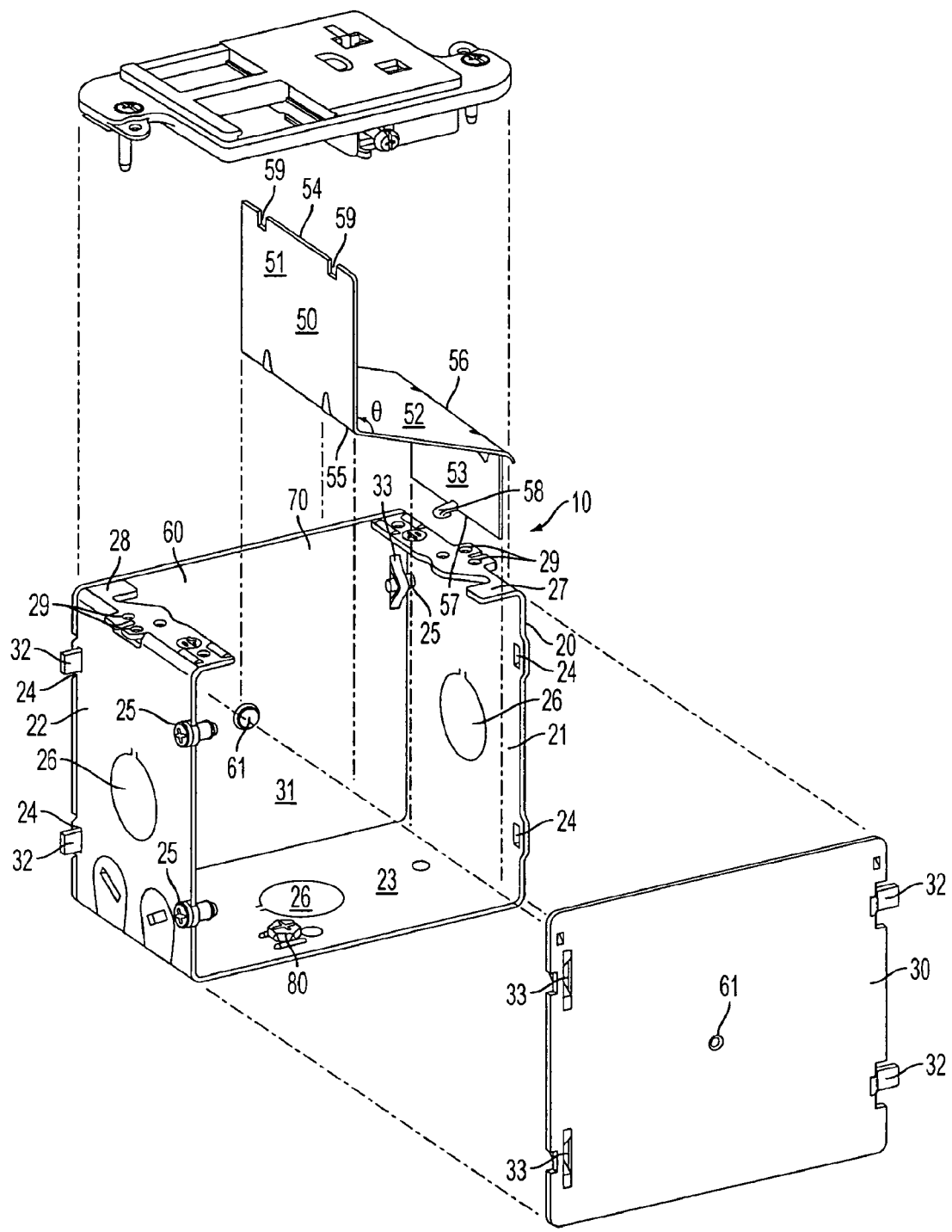
FIG. 1a is an exploded perspective view of an electrical outlet box in accordance with the present invention.
Figure 1B:
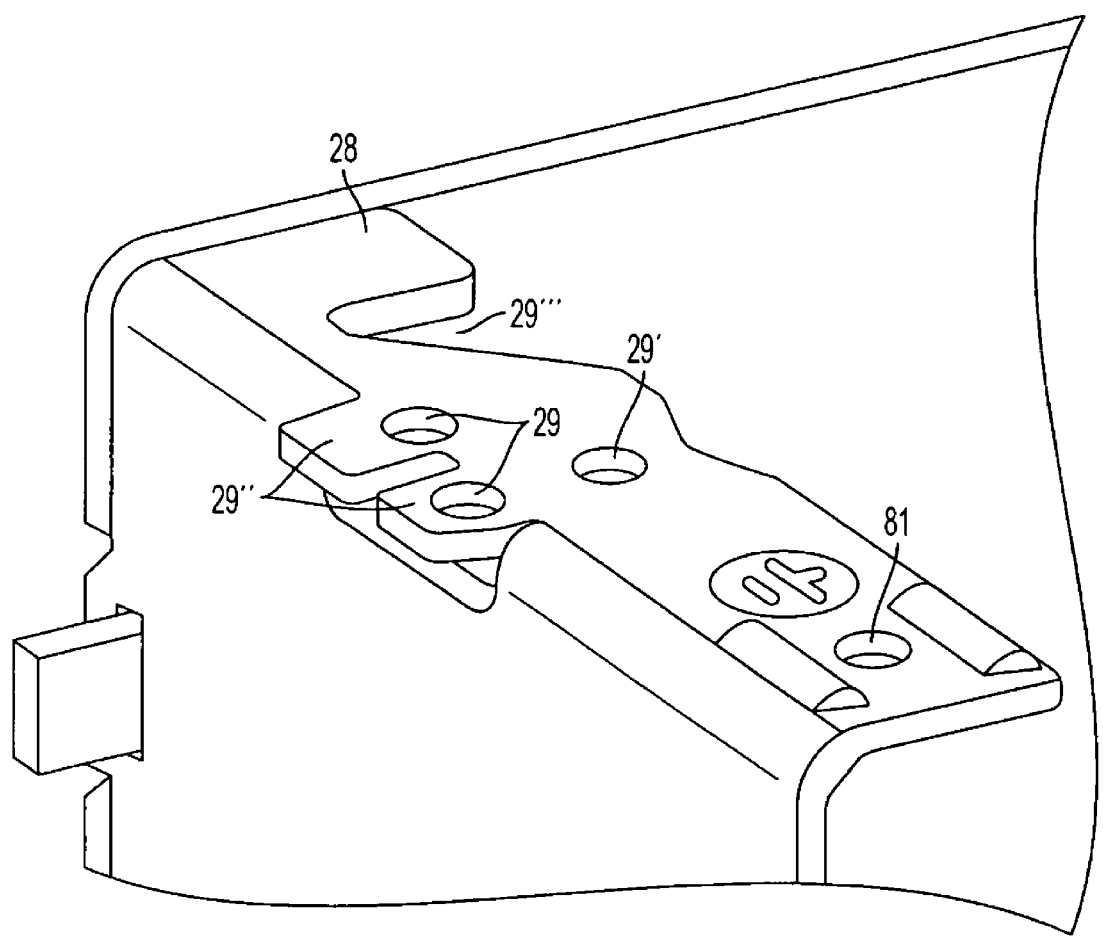

FIGS. 1a and 1b illustrate an exemplary embodiment of an electrical outlet box 10 in accordance with the present invention. In particular, outlet box 10 includes a U-shaped housing 20 having two planar ends 21, 22 and a planar floor 23. The ends 21, 22 and floor 23 of U-shaped housing 20 are integrally formed from a single piece of material, such as stamped steel or plastic, or some other suitable material sufficient to retain wiring for connecting to an electrical device, such as an electrical power and/or data receptacle, discussed in more detail below.

Two planar side panels 30, 31 attach to respective sides of housing 20. In FIG. 1a, side panel 30 is shown detached from housing 20 and side panel 31 is shown attached to the housing. In this example, tabs 32 on respective edges of side panels 30, 31 insert into corresponding slots 24 on the respective edges of ends 21, 22 of housing 20. After tabs 32 are inserted into slots 24, tabs 32 can be bent to provide a secure attachment. For example tabs 32 are bent approximately 90 degrees to contact the outer surface of ends 21, 22. Additionally, attachment means, such as screws 25, are provided in the edges of ends 21, 22 opposite slots 24 and mate with corresponding receiving means, such as holes 33 in edges of side panels 30, 31.

Ends 21, 22 and floor 23 of housing 20 are each optionally provided with a knockout 26. Knockouts 26 are removed from their respective ends or the floor to provide access for wiring through the ends and floor of the electrical box when installed. Additionally, at the top portion of ends 21, 22, two respective flanges 27, 28 are provided at right angles to respective ends 21, 22. Flanges 27, 28 are formed integral with ends 21, 22, respectively, and are formed in a direction that is inward of their respective ends. That is, flanges 27, 28 are directed towards each other and towards the inner volume of housing 10, as opposed to being directed outwardly as in the prior device shown in FIGS. 5 and 6.

As shown in FIGS. 1a and 1b, flanges 27, 28 each include a number of receiving holes 29 and 29' arranged to permit the attachment of an electrical device, such as an electrical receptacle, to the housing, as well as cutouts 29'''. For example, receiving holes 29 are uniquely arranged to permit the attachment of a known electrical receptacle device that includes both power and data terminations, such as a JLOAD™ receptacle provided by Hubbell Incorporated. Holes 29 are each formed in a respective platform 29'' which are cut from the material of flanges 27, 28. For example, housing 20 is formed from a single flat piece of material and is bent into its U-shape. Flanges 27, 28 are formed by bending the ends of the U-shaped housing 20 at right angles with ends 21, 22 after cutting rectangular platforms 29'' in the housing material at the bend area where the flanges are to be formed.

Figure 5:
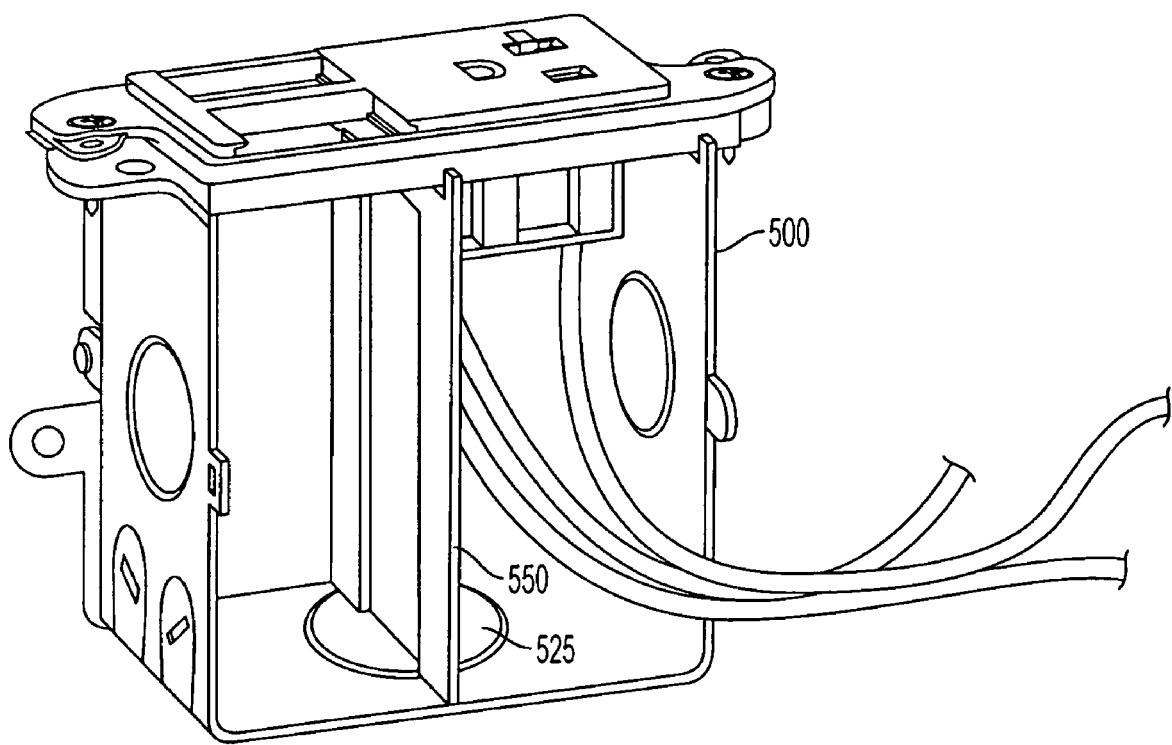
FIG. 5 is a cutaway perspective view of a wall-mountable electrical outlet box in accordance with a prior device.
Figure 6:
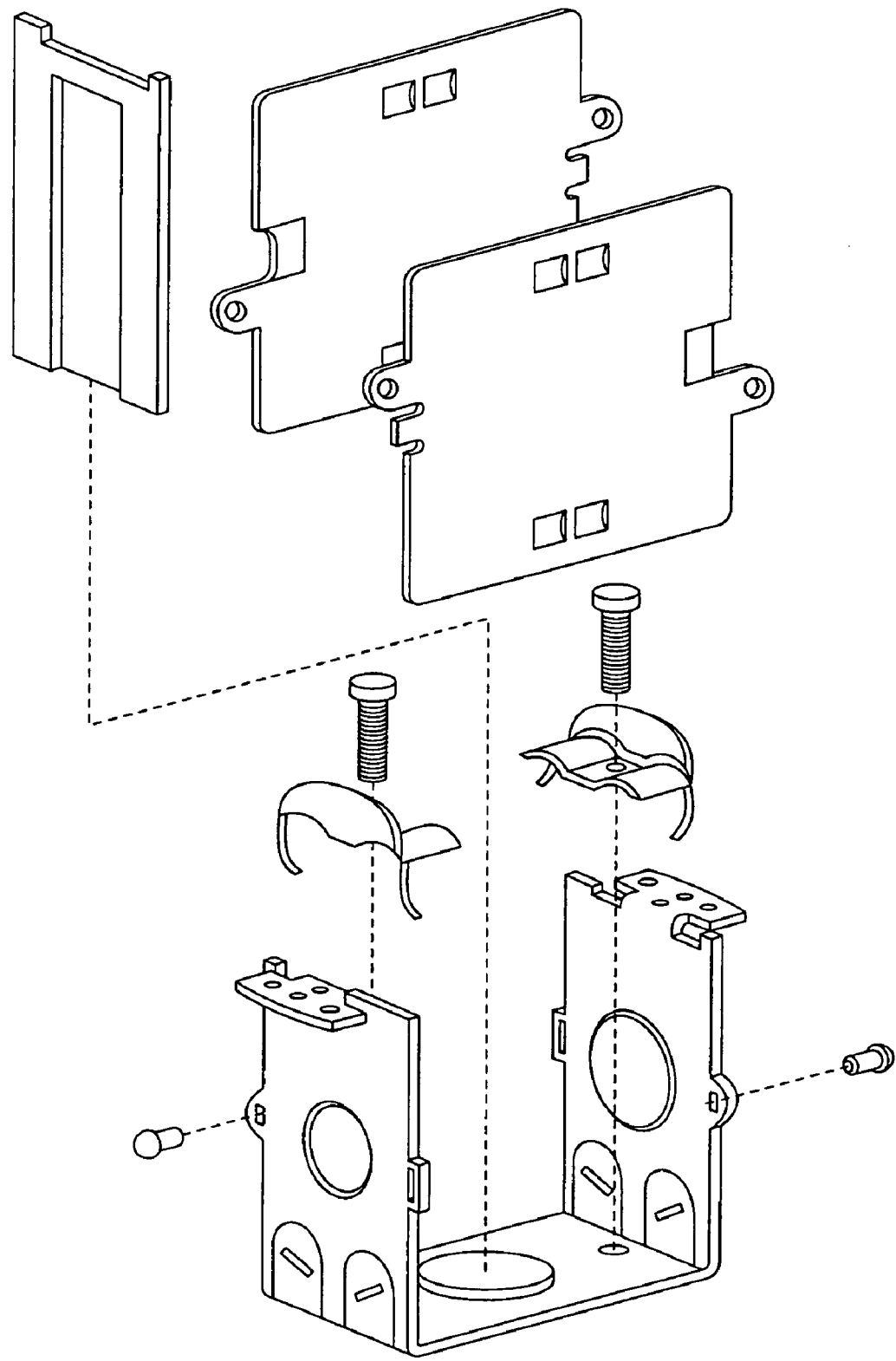
FIG. 6 is an exploded view of the wall-mountable electrical outlet box shown in FIG. 5.

Because the flanges are formed by bending them inward, towards each other, as opposed to away from each other, the electrical box in accordance with the present invention provides more total inner volume within the box, as opposed to, for example, conventional boxes and the boxes shown in FIGS. 5 and 6, and is still able to receive and attach to standard size receptacles. Cutouts 29''' are shaped to accommodate the unique structure of the housing of the combined power and data receptacle. For example, the underside of the housing of receptacle 75 shown in FIG. 1a includes triangular structures (not shown) on the underside and at either end of the receptacle that fit into cutouts 29''' of flanges 27, 28.

Alternatively, holes 29' in flanges 27, 28 are arranged to accommodate a standard receptacle. That is, as opposed to using the combined power and data receptacle mentioned above, the electrical outlet box in accordance with the present invention can alternatively accommodate a standard power receptacle. Specifically, a standard receptacle (not shown) has attachment holes that mate with holes 29' in flanges 27, 28. Accordingly, if a standard power receptacle is used instead of the combined power and data receptacle shown, an attachment means, such as a screw, is placed through the attachment hole at both ends of the receptacle and into holes 29' to attach the receptacle to the box 10.

It would be recognized by one of ordinary skill in the art that the hole and cutout pattern provided in flanges 27, 28 of the present embodiment are exemplary only and virtually any combination of different size holes with different locations can be accommodated in these flanges in order to accept and attach to different devices, as needed.

In accordance with the present embodiment of the invention a divider 50 is provided within outlet box 10. Divider 50 separates the interior of box 10 into two separate chambers 60 and 70. In particular, divider 50 isolates any wiring and/or electrical devices within chamber 60 from any other wiring and/or electrical devices within chamber 70. For example, chamber 60 on one side of divider 50 houses high voltage wiring, such as power cabling running through a house or other building, and terminates the high voltage wiring to a power receptacle. In this example, ground screw 80 provides a convenient location to attach a grounding wire from the power cabling to the metal housing 20. Holes 81 in flanges 27, 28 provide additional means for attaching a grounding screw to metal housing 20. Further, chamber 70 on the opposite side of divider 50 from chamber 60 houses low voltage wiring, such as telephone or data cables, and terminates the low voltage wiring to a corresponding low voltage receptacle.

According to the embodiment of FIGS. 1a and 1b, divider 50 is shaped such that chambers 60 and 70 have different volumes. For example, as shown, chamber 60 has a larger volume than adjacent chamber 70. As mentioned above, in this example chamber 60 can be used to house high voltage cabling and a corresponding termination device, which requires more space than low voltage cabling. For instance, electrical codes often require a specified amount of space be provided within an electrical outlet box to accommodate power cable termination and a different, i.e., less, amount of space be provided for low voltage wiring.

As shown in the exemplary embodiment of FIGS. 1*a* and 1*b*, divider 50 has three planar portions; a top portion 51, a middle portion 52 and a bottom portion 53. Top portion 51 is parallel to ends 21, 22 of housing 20 and has a first edge 54 with notches 59. Notches 59 receive corresponding sides of a receptacle device attached to flanges 27, 28 and assist in securing the receptacle device relative to the housing. Top portion 51 of divider 50 is also located approximately midway between ends 21, 22 of housing 20. In this manner, each of two receptacle terminations provided in a single receptacle device, such as the different portions of a combined power and data receptacle device, as mentioned above, are isolated from each other. Elbow 55 of divider 50 is located between top portion 51 and middle portion 52 and rests on nubs 61 of sides 30 and 31. Middle portion 52 is at a predefined angle θ with top portion 51. Angle θ can be any angle between 0-180 degrees, but is ideally between 90 and 135 degrees.

In the example shown in FIGS. 1*a* and 1*b*, middle portion 52 of divider 50 extends from elbow 55 to end 21 of housing 20 just below knockout 26 within end 21. Bottom portion 53 is located between elbow 56 and floor 23 of housing 20 and is flush against end 21. Clip 58 on the bottom edge 57 of bottom portion 53 of divider 50 clips into a corresponding hole 58' in floor 23. Accordingly, divider 50 is held in place within the inside area of box 10 by clip 58 and also by elbow 55 resting on nubs 61.

As shown in the exemplary embodiment of FIGS. 1*a* and 1*b*, divider 50 does not interfere with any of the three knockouts 26 in the surfaces of housing 20. Thus, wiring is able to enter the inner volume of box 10 in either of the ends 21, 22 and also through floor 23. Additionally, divider 50 is reversible in that it can be flipped around in order to reverse the large and small volume sides 60, 70, accordingly. Specifically, divider 50 is easily unclipped at clip 58 and flipped around so clip 58 is placed in a different hole (not shown) which is adjacent to end 22. In this case, side 60 of box 10 would have less volume that side 70.

Figure 2:
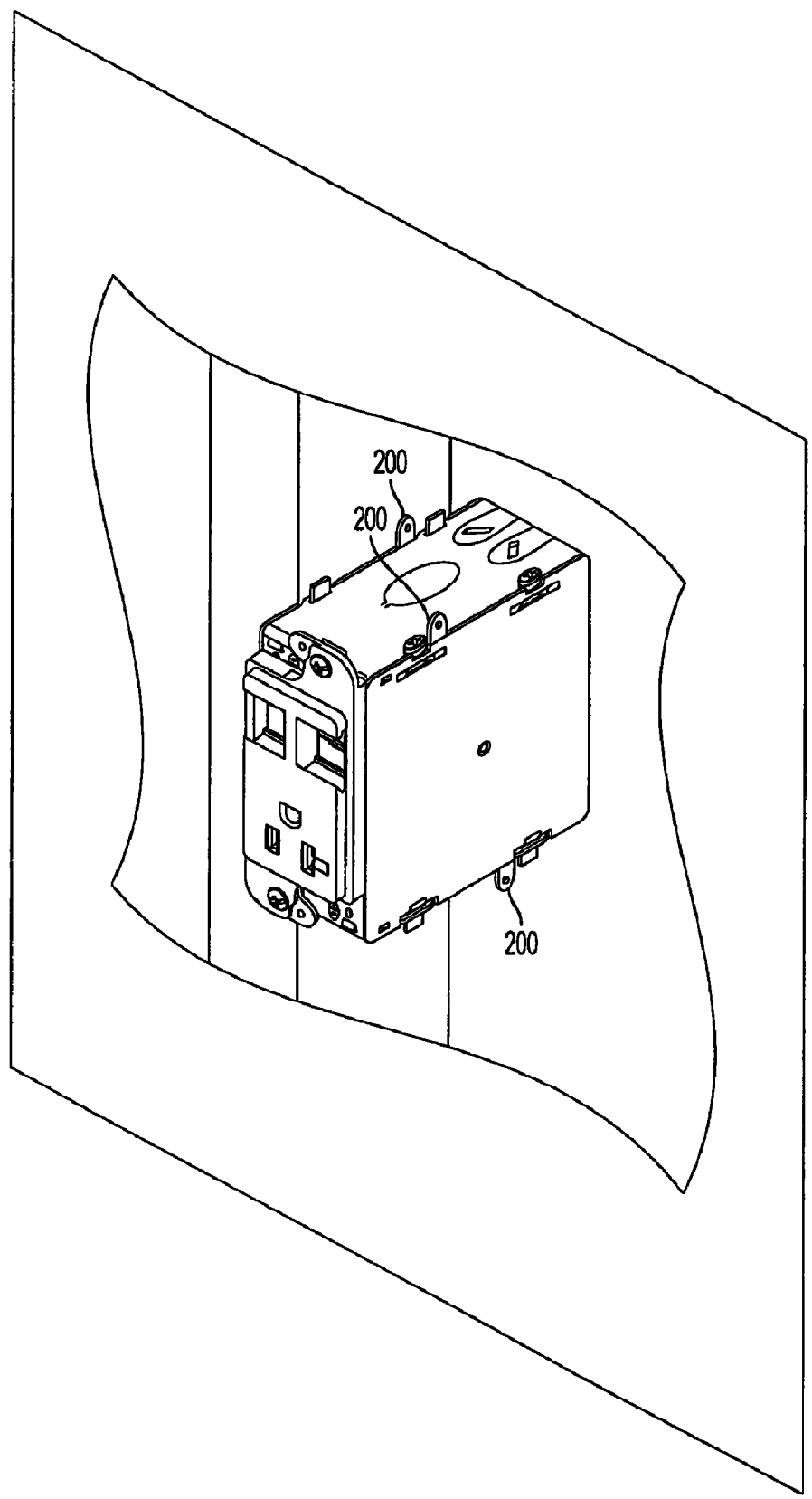
FIG. 2 is a perspective view of a wall-mounted embodiment of an electrical outlet box in accordance with the present invention.

FIG. 2 illustrates an exemplary application of the electrical box 10 of FIGS. 1*a* and 1*b*. More particularly, in the embodiment shown in FIG. 2, sides 230, 231 of box 210 include attachment loops 200 for attaching box 210 to a wall stud 230 within a wall 240. Loops 200 are provided on both sides 230 and 231 so box 210 can be attached to either side of stud 230. For example, screws or nails (not shown) are driven through loops 200 to attach box 10 to the stud 230. In accordance with common practices, the receptacle attached to box 210 protrudes from the wall 240 providing access to the receptacle device attached to box 210.

Figure 3:
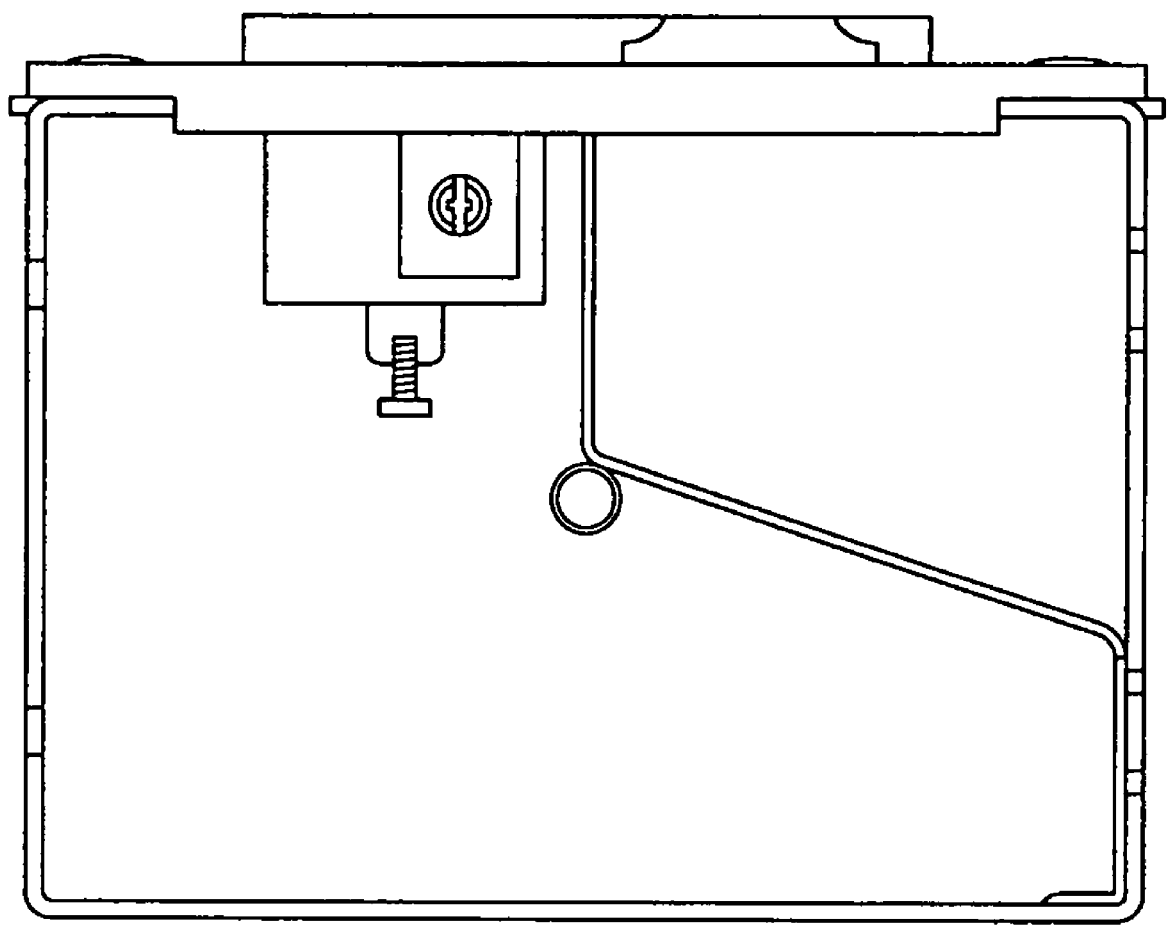
FIG. 3 is a cutaway side-view of a wall-mountable electrical outlet box in accordance with the present invention.

FIG. 3 is a cutaway side view of the electrical box illustrated in FIG. 1*a*. In particular, FIG. 3 clearly shows the relative sizes of the two chambers 360, 370 formed within the inner volume of box 310 by divider 352. For example, in accordance with one embodiment of the present invention the entire volume contained within box 310 is 29 in$^3$ and chamber 360 contains approximately 20 in$^3$ and chamber 370 contains approximately 9 in$^3$. One skilled in the art would understand, however, that different volumes can be obtained depending on the size of box 310 and the shape of divider 352. As shown, wiring (not shown) can be inserted through knockouts 326 on the left and right sides and the bottom of box 310. Specifically, wiring for high power voltage devices, such as power receptacle 390, can enter box 310 through knockouts in either the left-side or bottom of box 310 and low voltage wiring can enter box 310 through a knockout 326 located in the right-side of the box.

Figure 4:
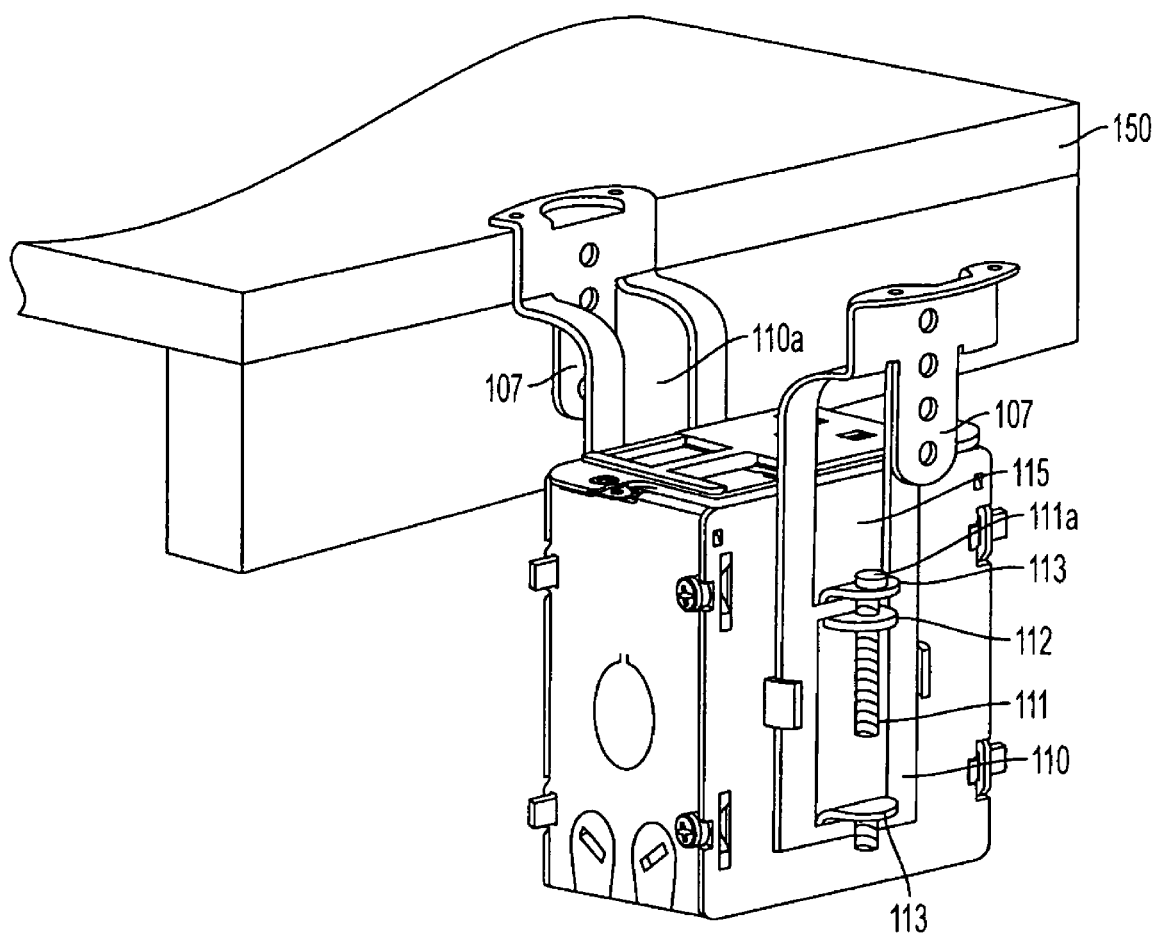
FIG. 4 is a perspective view of a floor-mounted embodiment of an electrical outlet box in accordance with the present invention.

FIG. 4 illustrates a further embodiment of the present invention. More particularly, the embodiment illustrated in FIG. 4 is a floor-mounted electrical box in accordance with the invention. Box 400 in FIG. 4 is essentially the same as box 10 shown in FIGS. 1*a* and 1*b* except that box 400 includes additional brackets 410 that attach to sides 430 and 431 and enable the box to be suspended beneath a floor 450.

Adjustment mechanisms 410 allow the box 400 to be installed within the floor at any desired height relative to the flooring material 450. For example, according to one exemplary embodiment, adjustment mechanisms 410 are adjusted to maintain the box 400 approximately 1.5 inches below the floor material 450. As shown in the embodiment of FIG. 4, the length of adjustment screw 411 determines how far below the flooring material 450 the box 400 can be located. More particularly, a threaded adjustment flange 412 is provided as shown and is integral with, or connected to, the side of the housing of box 400. Additionally, two retainer flanges 413 are provided as shown and are integral with, or connected to, adjustment mechanism 410.

Adjustment screw 411 is rotated, or turned, to adjust the relative height of box 400. As the screw 411 is rotated, the screw remains fixed relative to retainer flanges 413 because the holes in retainer flanges are not threaded. Further, because the holes in adjustment flanges 412 are threaded and also because adjustment mechanism 410 is in a slideable relationship with the side of box 400, as the screw 411 is turned the box 400 raises or lowers relative to the number of turns of screw 411. As adjustment screw 411 is rotated, box 400 moves up or down, i.e., in the "Y" direction, depending on which direction the screw 411 is rotated. Further, because there are two adjustment mechanisms 410, i.e., on either side of the box, as well as respective adjustment and retainer flanges 412 and 413, and adjustment screws 411, on either side of box 400, the relative tilt of box 400 in the "Z" direction can be adjusted based on the relative turns of the two respective adjustment screws 411.

Also, depending on the circumstances under which the box 400 is installed, flanges 406 and 407 are attached to different structures. For example, if the box is installed in an existing floor, e.g., where a hole is cut in the floor material, such as carpet overlying plywood, top flanges 406 rest on top of the carpet, or possibly just under the carpet, directly adjacent to the hole. Alternatively, if the box is installed in new construction, e.g., before the flooring material is installed, the top flanges 406 can be attached to the top of a floor joist and/or aide flanges 407 can be attached to the side of the joist. Under these conditions, the flooring material, such as plywood, hardwood flooring, etc., are installed over the top of flanges 406. Accordingly, the adjustable box 400 in accordance with this embodiment of the invention is very versatile and can be installed in new or old construction and still maintain its adjustability with respect to the height of the recessed receptacle.

While various aspects of the present invention have been particularly shown and described with reference to the exemplary, non-limiting, embodiments above, it will be understood by those skilled in the art that various additional aspects and embodiments may be contemplated without departing from the spirit and scope of the present invention.

It would be understood that a device or method incorporating any of the additional or alternative details mentioned above would fall within the scope of the present invention as determined based upon the claims below and any equivalents thereof.

Other aspects, objects and advantages of the present invention can be obtained from a study of the drawings, the disclosure and the appended claims.

What is claimed is:

1. An electrical outlet box comprising:
   a single-gang housing enclosing an interior volume, said interior volume being adapted to retain at least one electrical outlet; and
   a divider within said housing, said divider separating the interior volume of said housing into first and second chambers having different respective volumes, each of said first and second chambers retaining an electrical outlet;
   wherein said divider comprises first, second, and third planar portions, wherein said first and third planar portions are parallel with ends of said housing.

2. The outlet box claimed in claim 1, wherein said housing comprises a base and two ends formed integrally with said base and two sides each attached to said ends, wherein the sides of said housing are attached to the ends of said housing screws.

3. The outlet box claimed in claim 1, wherein said second planar portion of said divider is not parallel with either said first or said third planar portions.

4. The outlet box claimed in claim 1, wherein one end of said second planar portion of said divider is attached to one end of said first planar portion and another end of said second planar portion is attached to one end of said third planar portion.

5. The outlet box claimed in claim 1, wherein said divider is movable to selectively switch between the first and second volumes being larger than the other.

6. The outlet box claimed in claim 1, wherein said second planar portion of said divider makes an angle less than 180 degrees with said first planar portion.

7. The outlet box claimed in claim 1, wherein said second planar portion of said divider makes an angle between 90 and 135 degrees with said first and third planar portions.

8. The electrical outlet box claimed in claim 1, further comprising at least one attachment loop through which a fastener is placed to attach the outlet box to a support structure of a wall.

9. The electrical outlet box claimed in claim 1, further comprising at least one bracket for attaching the outlet box to a floor.

10. The electrical outlet box claimed in claim 9, wherein said at least one bracket is adjustable for varying the position of the outlet box with respect to the floor.

11. The electrical outlet box claimed in claim 1, wherein said outlet box is made of a conductive material and further comprises at least one ground fastener for providing electrical ground to the box.

12. An electrical outlet box comprising:
    a single-gang housing closed on five sides and operable to enclose power and data wiring;
    a divider detachably connected to an inside surface of said housing and separating an inner volume of said housing into two chambers having different volumes; and,
    a receptacle device having a high voltage side for terminating high voltage wires and a low voltage side for terminating low voltage wires, said receptacle being connected to said housing,
    wherein said divider separates the high voltage wiring and the low voltage wiring within said housing.

13. The electrical outlet box claimed in claim 12, wherein said housing comprises at least one flange to which said receptacle is connected.

14. An electrical outlet box comprising:
    a single-gang housing having an inner volume;
    a divider detachably connected to an inside surface of said housing separating the inner volume of said housing into at least two chambers, at least one of the chambers having a different volume than the other chamber(s); and,
    a receptacle device detachably connected to said housing and having at least two electrical receptacles, each receptacle corresponding to a respective chamber.

15. The electrical outlet box claimed in claim 14, wherein said housing further comprises at least one removable portion that can be removed from a surface of said housing to provide access to a respective chamber and said divider does not interfere with any opening in the surface of said housing created by the removal of said at least one removable portion.

16. The electrical outlet box claimed in claim 14, wherein said housing comprises at least one flange arranged to extend inward from a respective end surface of said housing and to which said receptacle device is detachably connected to.

17. The electrical outlet box claimed in claim 16, wherein said at least one flange has at least one integral tab extending outwardly and beyond the respective surface of said housing.

* * * * *